No. 790,495. PATENTED MAY 23, 1905.
J. J. GLEDHILL.
TRUCK FOR HANDLING BRICKS.
APPLICATION FILED APR. 6, 1903.
3 SHEETS—SHEET 1.
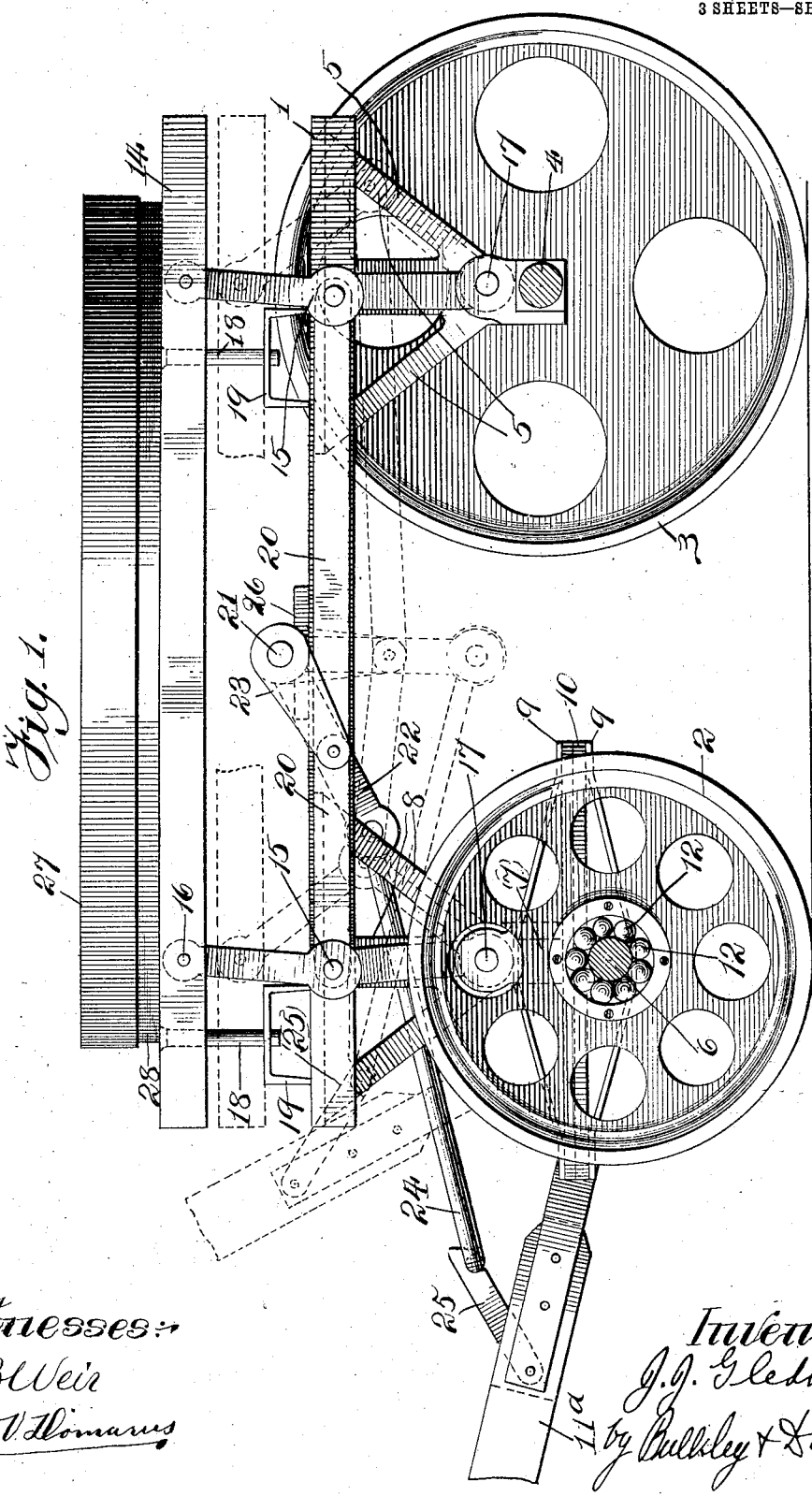
Witnesses:
JB Weir
Geo V Homans
Inventor:
J. J. Gledhill
by Bulkley & Durand
Attys No. 790,495. PATENTED MAY 23, 1905.
J. J. GLEDHILL.
TRUCK FOR HANDLING BRICKS.
APPLICATION FILED APR. 6, 1903.
3 SHEETS—SHEET 2.
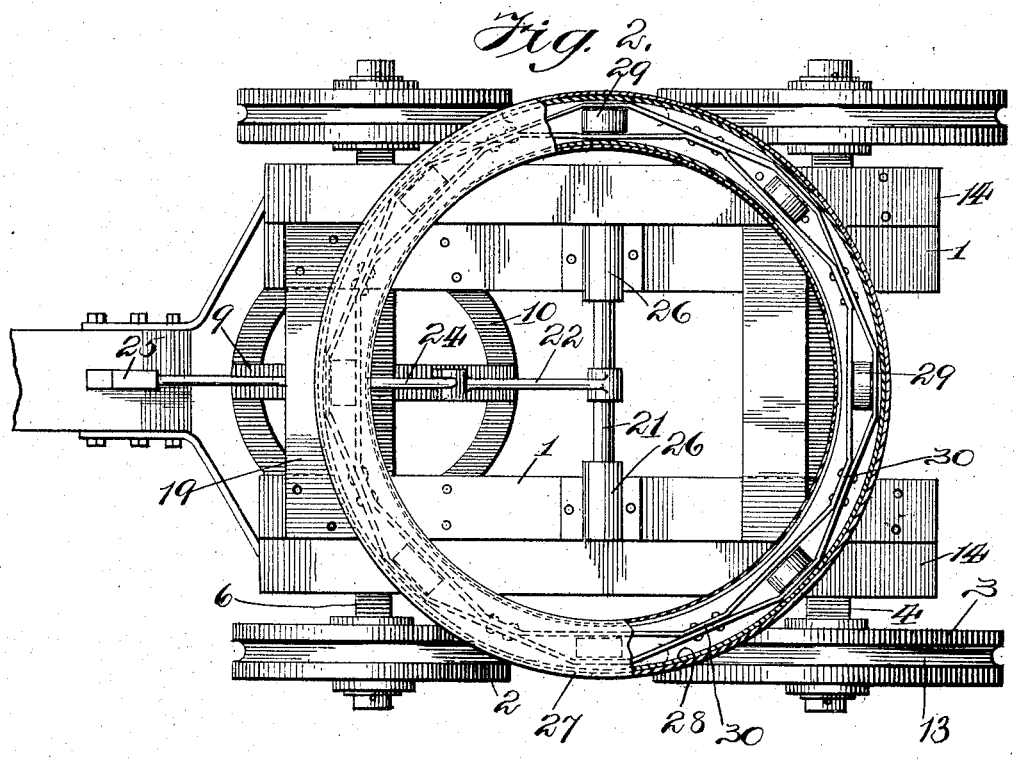
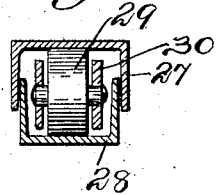
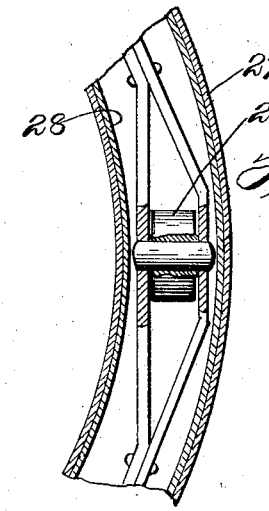
Witnesses:
JB Weir
Geo. V. Homans
Inventor:
J. J. Gledhill
by Bulkley & Durand
Attys No. 790,495. PATENTED MAY 23, 1905.
J. J. GLEDHILL.
TRUCK FOR HANDLING BRICKS.
APPLICATION FILED APR. 6, 1903.
3 SHEETS—SHEET 3.
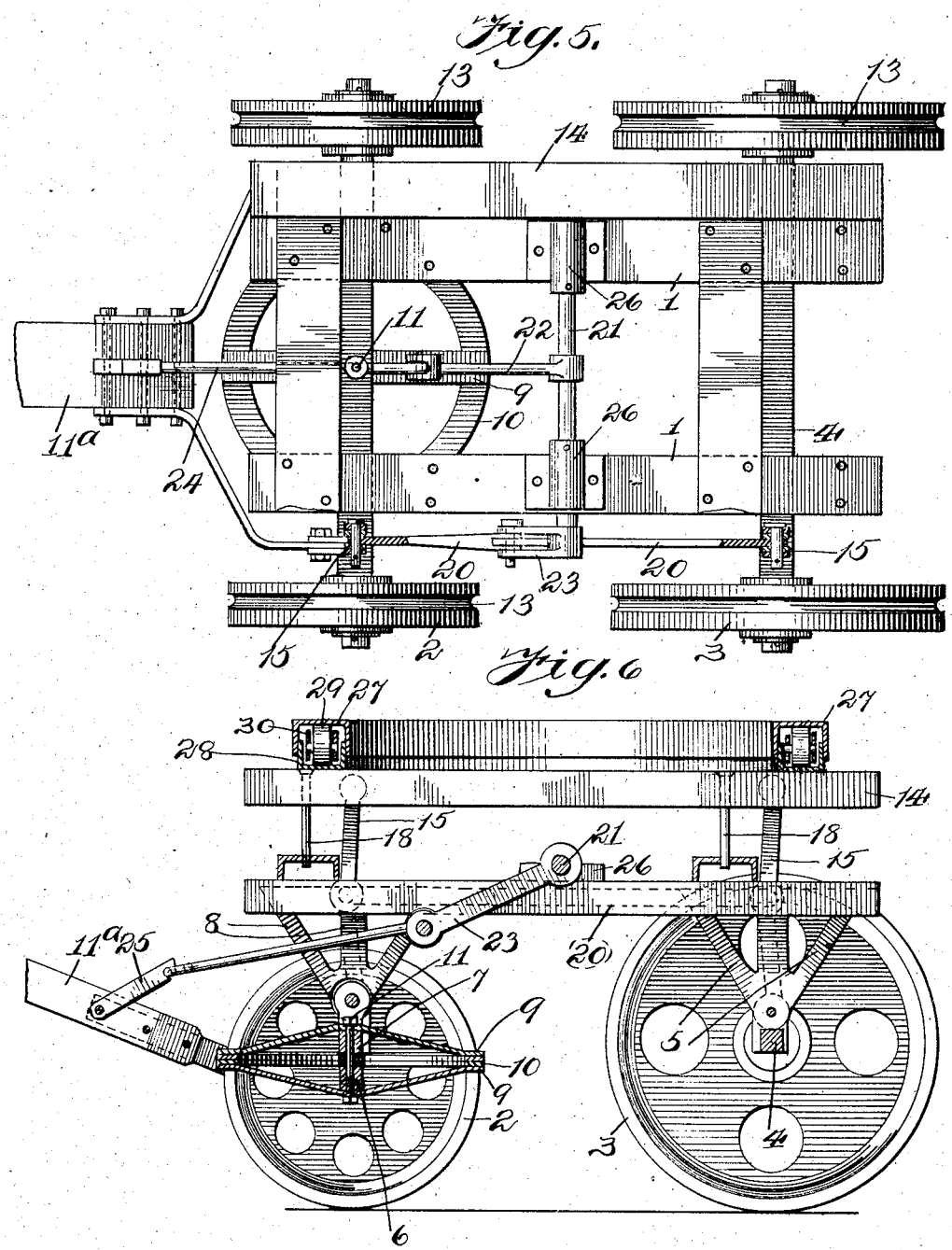

No. 790,495. Patented May 23, 1905.

UNITED STATES PATENT OFFICE.

JOHN J. GLEDHILL, OF CHICAGO, ILLINOIS.

TRUCK FOR HANDLING BRICKS.

SPECIFICATION forming part of Letters Patent No. 790,495, dated May 23, 1905.

Application filed April 6, 1903. Serial No. 151,212.

*To all whom it may concern:*

Be it known that I, JOHN J. GLEDHILL, a citizen of the United States of America, and a resident of Chicago, Cook county, Illinois, have invented a certain new and useful Improvement in Trucks for Handling Bricks, of which the following is a specification.

This invention relates to trucks for handling brick. The particular manner of using a truck for this purpose consists in first drawing the truck beneath a suitably-elevated pallet of brick, adjusting or raising the body of the truck in such manner as to lift the pallet from the supports, and in then drawing the truck forward for the purpose of transferring the brick to the desired point. It is a truck for this particular purpose to which this invention relates.

Generally stated, the object of this invention is to provide a simple and highly efficient truck of the foregoing character.

A special object is to provide a truck which can be turned to one side or the other and which can be easily turned around.

Another object is to provide a truck having wheels adapted to travel either upon rails or upon a floor.

A further object is to provide a truck having a turn-table upon which the pallet of brick can be received and upon which the brick can be rotated to any desired position.

Another object is to provide an improved toggle arrangement for raising and lowering the upper or supporting portion of the truck.

It is also an object to provide certain details and features of improvement tending to increase the general efficiency of a truck of this particular character.

To the foregoing and other useful ends this invention consists in matters hereinafter set forth and claimed.

In the accompanying drawings, Figure 1 is a side elevation of a truck constructed in accordance with this invention, the near rear wheel being removed and the vertically-adjustable portion of the truck being shown in its lowered position in dotted lines. Fig. 2 is a plan, on a smaller scale, of the truck shown in Fig. 1, a portion of the top of the turn-table being broken away for the purpose of showing the wheels or rolls. Fig. 3 is an enlarged cross-section through a portion of the turn-table. Fig. 4 is an enlarged horizontal section through a portion of the turn-table. Fig. 5 is a view similar to Fig. 2, with the exception that the turn-table is not shown and that the toggle connections at one side of the truck are shown in horizontal section. Fig. 6 is a vertical longitudinal section of the truck.

The invention can be embodied in a truck of the character shown in the drawings. As thus embodied the invention comprises a suitable body-frame, which may consist of a couple of parallel arms 1 1 and which is preferably supported in a suitably-elevated position by the front wheels 2 and the rear wheels 3. The rear wheels can be mounted upon the spindles of the rear axle 4, and this axle can be connected with the said body-frame through the medium of the bolster-like portions 5.

The forward running-gear preferably involves a fifth-wheel device whereby the truck may be turned around or its course altered at will. To such end the said forward running-gear may comprise an axle 6, upon which the forward wheels 2 are mounted and which is connected with the body-frame through the medium of the bolster 7 and the bolster-like portions 8. A fifth-wheel device, comprising the circle-irons 9 and 10 and the king-bolt 11, preferably forms the medium of rotative connection between the front axle and the bolster 7. A tongue 11ª can be connected with the front axle in any suitable manner.

It will be observed that the front wheels 2 are preferably of such size and that the construction and arrangement of the body-frame is such that the said front wheels can be turned to any extent in either direction, so as to facilitate turning around. In other words, the front wheels may undercut the body. Furthermore, all of the wheels are preferably provided with ball-bearings 12. This greatly reduces friction and renders the truck exceedingly easy to handle. Also as a feature of further improvement the wheels are all provided with substantially flat treads, the tread of each wheel being wide enough to permit it to travel readily upon either the ground or a suitable flooring and each wheel being preferably provided with a groove 13. The grooves in the wheels adapt them for traveling upon straps or rails without in any way rendering them unfit for travel upon the ground or upon a floor.

The vertically-adjustable upper portion 14 of the body-frame is adapted to rise and fall for the purpose of lifting the brick from off the supports. This vertically-adjustable portion of the body-frame may be constructed of a pair of channel-irons, connected with the main or stationary portion of the body-frame through the medium of the toggle connections 15. These toggle connections have their upper ends pivoted at 16 to the said vertically-adjustable portion of the body-frame and have their lower ends likewise connected at 17 with the forward and rear portions of the stationary frame or body. The frame-like structure thus arranged for vertical movement can be steadied against forward or rearward lurch during its rise and fall by means of steady-pins 18. These pins can be secured to the upper framework and arranged to work in openings in the cross-beams 19, which latter constitute a portion of the stationary framework. It will be understood that the toggles 15 shown in Fig. 1 are duplicated at the other side of the truck. As a simple and effective arrangement for operating these toggles so as to cause them to raise and lower the upper portion of the frame or body the toggles at each side of the truck can be connected by horizontally-arranged bars 20, and these bars can in turn be connected with the swinging tongue through the medium of the shaft 21, the crank-arms 22 and 23, the connecting-rod 24, and the hook 25. The connection between the hook 25 and rod 24 is preferably such that the connection thus provided between the tongue and the toggle arrangement can be opened or closed at will, so as to render the tongue either free or operative to raise the upper portion of the frame. The shaft 21 can be mounted in suitable bearings 26 on the two channel-irons.

The turn-table, which is preferably mounted upon the upper vertically-adjustable portion of the body-frame, may consist of the upper and lower circle-irons 27 and 28, each iron being trough-shaped in cross-section. In order that the upper circle 27 may revolve freely, the two circular pieces of channel-iron thus adapted to fit together can be separated by the antifriction rolls or wheels 29. These rolls can be mounted or arranged in any suitable manner; but as a matter of further and special improvement they are preferably mounted on a framework 30, which is adapted to travel with the rolls when the upper member 27 of the turn-table is rotated for the purpose of shifting or altering the position of the pallet of brick.

In operation the truck, with the parts in the position shown in dotted lines in Fig. 1, is first positioned directly below the pallet of brick. The tongue is then swung downward from the position shown in dotted lines in Fig. 1, and during this part of the operation the turn-table is caused to rise upwardly against the pallet of brick, and the upward movement continuing the pallet is lifted from the supports. When the toggles are brought to the positions in which they are shown in full lines in Fig. 1, they become "self-locking," so to speak, the joints of the toggles being brought past the center, so that each toggle rests against one of the cross-beams 19. In this condition the truck, with the pallet of brick upon it, can be drawn to the point or place to which it is desired to transport the brick. Obviously with a truck of the construction described this operation of transferring a considerable quantity of brick from one place to another is accomplished in an easy and convenient manner. The fifth-wheel with which the forward portion of the truck is provided permits the wheels of the truck to leave the track and travel upon a suitable floor or even upon the ground and permits the truck to be easily handled and turned around.

I claim as my invention—

1. A truck for handling brick, comprising a stationary body portion, front and rear wheels, an upper vertically-adjustable body portion, means for guiding the upper adjustable body portion in its up and down movements, a plurality of toggle connections arranged at opposite sides of the truck and adapted to connect the stationary body portion with the upper vertically-adjustable body portion, a plurality of longitudinally-extending bars for connecting the said toggle connections, a transversely-extending shaft, crank-arms on said shaft connected with said bars, another crank-arm on said shaft, a suitable tongue, and suitable connection between said tongue, and said last-mentioned crank-arm, the suitable devices being adapted to maintain the adjustable upper body portion in a horizontal position.

2. A truck for handling brick, comprising a stationary body portion, front and rear wheels, a fifth-wheel device interposed as medium of connection between the forward wheels and the said stationary body portion, a vertically-adjustable upper body portion, means for guiding said adjustable body portion in its up and down movements, a plurality of toggle connections between the said upper and lower body portions for adjusting the upper body portion, and for maintaining the upper body portion in a horizontal position throughout the limits of its adjustment, a suitable tongue, and means including a transversely-arranged rock-shaft with a crank-arm at each end for connecting said tongue with said toggle connections.

3. A truck for handling brick, comprising a lower stationary body portion, an upper vertically-adjustable body portion, means for guiding the upper adjustable body portion in its up and down movements, front and rear wheels, each wheel having a broad flat tread with a circumferentially-extending groove, whereby the wheels may travel either upon a track or upon a flooring, means including toggles and a rock-shaft, the cranks on the shaft being connected with the middle portion of said toggles, for adjusting the upper body portion, the said adjusting means being adapted to maintain the upper body portion in a horizontal position, and a fifth-wheel device interposed as medium of connection between the front wheels and the said stationary body portion.

4. A truck for handling brick, comprising a suitable stationary body portion, an upper vertically-adjustable body portion, suitable adjusting devices including a transversely-arranged rock-shaft with a crank-arm at each end for raising and lowering said upper body portion, and for maintaining the upper body portion in a horizontal position throughout the limits of its adjustment, front and rear wheels, means for guiding said adjustable body portion in its up and down movements, and a fifth-wheel device interposed as medium of connection between the forward wheels and the said stationary body portion.

5. A truck for handling brick, comprising a stationary body portion, front and rear wheels, a fifth-wheel device interposed as medium of connection between the forward wheels and the said stationary body portion, an upper vertically-adjustable body portion, means for guiding said adjustable body portion in its up and down movements, and means including a transversely-arranged rock-shaft with a crank-arm at each end and toggle devices for raising and lowering said upper body portion, and for maintaining the upper body portion in a horizontal position throughout the limits of its adjustment.

6. A truck for handling brick, comprising a lower stationary and an upper vertically-adjustable body portion, means for guiding the upper adjustable body portion in its up and down movements, a plurality of toggle connections between the upper and lower body portions, suitable connections including a transversely-arranged rock-shaft with a crank-arm at each end for operating said toggle connections for the purpose of raising and lowering the upper body portion, the said adjusting means being adapted to maintain the upper body portion in a horizontal position, front and rear supporting-wheels, and a turn-table mounted upon the said upper body portion.

7. A truck for handling brick, comprising a lower stationary body portion, an upper vertically-adjustable body portion, means for guiding said adjustable body portion in its up and down movements, front and rear wheels, a plurality of toggle connections between the said body portions for adjusting the upper body portion, and for maintaining the upper body portion in a horizontal position throughout the limits of its adjustment, stops against which the toggles may be brought to an at-rest position when the upper body portion is raised to its elevated position, and suitable connections including a transversely-arranged rock-shaft with a crank-arm at each end for operating said toggle connections.

8. A truck for handling brick, comprising a body, rear supporting-wheels, front supporting-wheels, a fifth-wheel device connecting the front wheels with the body, a vertically-adjustable supporting-framework carried by the body, toggles for raising and lowering said framework, a transversely-arranged rock-shaft mounted on the body at a point between the front and rear wheels, means for rocking said shaft, and crank-arms on said shaft suitably connected with the middle portions of said toggles.

9. A truck for handling brick, comprising a suitable body, rear wheels, front wheels, a fifth-wheel device connecting the front wheels with the body, a vertically-adjustable framework carried by the body, guides in which said framework slides up and down, and a tongue connected and arranged to have the double function of raising and lowering said framework and operating said fifth-wheel device, the construction including a disconnecting device intermediate of the tongue and framework, whereby the tongue may be totally disconnected from the said adjustable framework.

10. A truck for handling brick, comprising a suitable body, front and rear wheels, all of said wheels having broad treads with centrally-arranged and peripherally-extending grooves, the said wheels being thereby adapted to travel either on rails or a floor-surface, a fifth-wheel device connecting the front wheels with the body, a vertically-adjustable framework carried by the body, guides in which said framework slides up and down, and a tongue connected and arranged to have the double function of raising and lowering said framework and operating said fifth-wheel device, the construction including a disconnecting device intermediate of the tongue and framework, whereby the tongue may be totally disconnected from the said adjustable framework.

11. A truck for handling brick, comprising a body, front and rear wheels, a fifth-wheel device between the front wheels and the body, a vertically-adjustable framework carried by said body, guides in which said framework slides up and down, a turn-table carried by said vertically-adjustable framework, and a tongue connected and arranged to have the double function of raising and lowering the framework and operating said fifth-wheel device, the connections including a disconnecting device intermediate of the tongue and framework, whereby the tongue may be totally disconnected from the said adjustable framework.

12. A truck for handling brick, comprising a suitable body, front and rear wheels, a fifth-wheel device between the body and the front wheels, a vertically-adjustable framework carried by the body, a rock-shaft connected and arranged for raising and lowering said framework, and a tongue connected and arranged to have the double function of rocking said shaft and operating said fifth-wheel device, the connections including a disconnecting device intermediate of the tongue and framework, whereby the tongue may be totally disconnected from said adjustable framework.

13. A truck for handling brick, comprising a suitable body, front and rear wheels, all of said wheels having broad treads with centrally-arranged and peripherally-extending grooves, the said wheels being thereby adapted to travel either on rails or a floor-surface, a fifth-wheel device connecting the front wheels with the body, a vertically-adjustable framework carried by the body, and a tongue connected and arranged to have the double function of raising and lowering said framework and operating said fifth-wheel device, the connections including toggles operated by the tongue, and there being guiding devices for holding the adjustable framework against horizontal movement.

14. A truck for handling brick, comprising a suitable body, rear wheels, front wheels, a fifth-wheel device connecting the front wheels with the body, a vertically-adjustable framework carried by the body, and a tongue connected and arranged to have the double function of raising and lowering said framework and operating said fifth-wheel device, the connections including toggles operated by the tongue, and there being guiding devices for holding the adjustable framework against horizontal movement.

15. A truck for handling brick, comprising a body, front and rear wheels, a fifth-wheel device between the front wheels and the body, a vertically-adjustable framework carried by said body, a turn-table carried by said vertically-adjustable framework, and a tongue connected and arranged to have the double function of raising and lowering said framework and operating said fifth-wheel device, the connections including toggles operated by the tongue, and there being guiding devices for holding the adjustable framework against horizontal movement.

16. A truck for handling brick, comprising a suitable body, front and rear wheels, a fifth-wheel device between the body and the front wheels, a vertically-adjustable framework carried by the body, a rock-shaft connected and arranged for raising and lowering said framework, and a tongue connected and arranged to have the double function of rocking said shaft and operating said fifth-wheel device, the connections including toggles operated by the tongue, and there being guiding devices for holding the adjustable framework against horizontal movement.

17. A truck for handling brick, comprising a body-frame, front and rear wheels, a fifth-wheel device interposed between the front wheels and the body-frame, an upper vertically-adjustable body portion, toggles connecting the upper portion with the lower body-frame, a tongue for controlling said fifth-wheel device, and means for connecting said tongue with the middle portions or joints of said toggles, whereby the said tongue has the double function of raising and lowering the upper body portion and operating said fifth-wheel device.

18. A truck for handling brick, comprising a suitable body-frame, front and rear wheels, a fifth-wheel device between the front wheels and the body-frame, a vertically-adjustable upper body portion, front and rear toggles for raising and lowering said body portion, and a tongue connected and arranged to operate said toggles and control said fifth-wheel device.

Signed by me at Chicago, Cook county, Illinois, this 2d day of April, 1903.

JOHN J. GLEDHILL.

Witnesses:
  CHAS. HICKOK,
  WM. A. HARDERS.